D. H. STEPHENS, OF RIVERTON, CONNECTICUT.

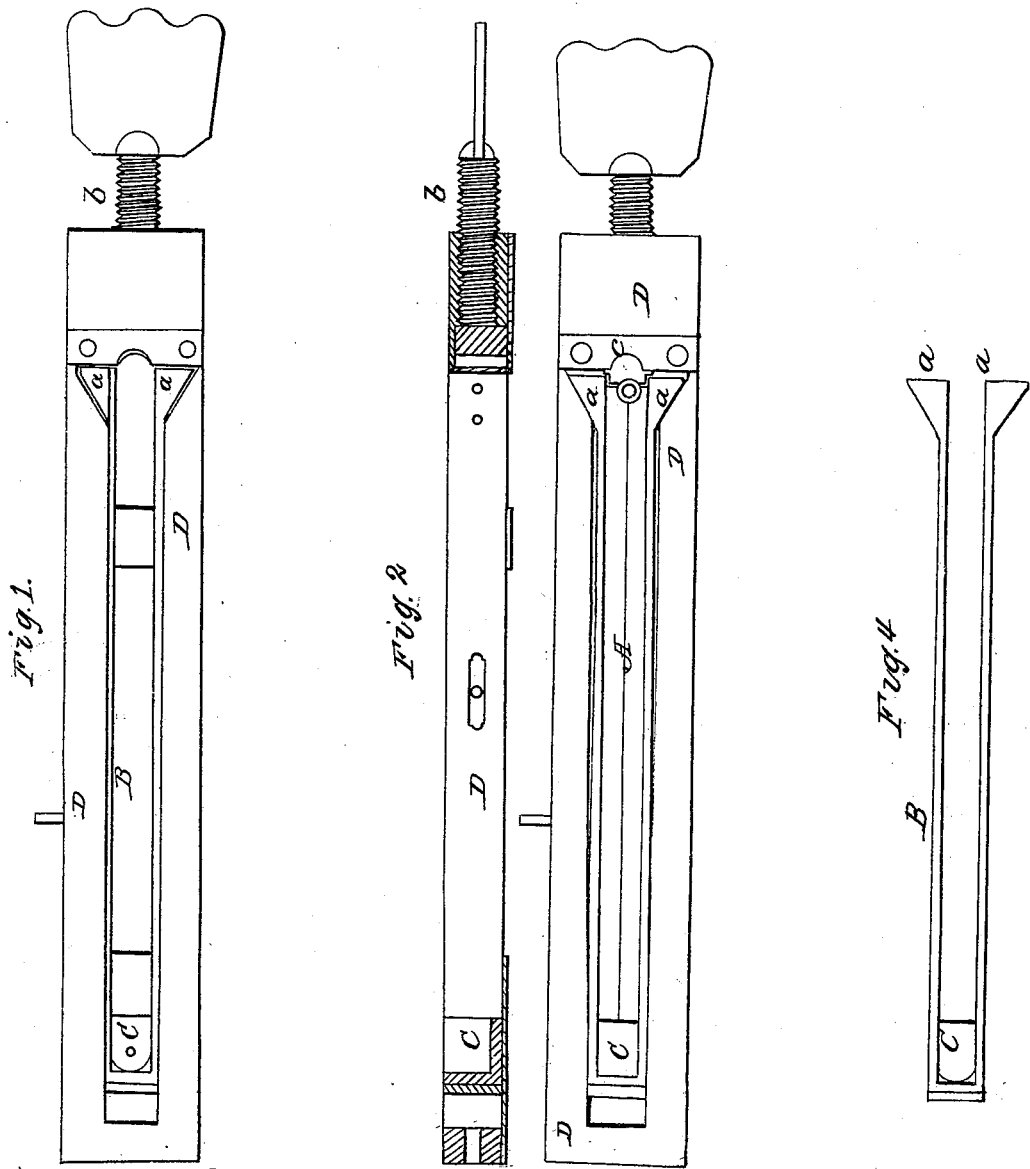

Letters Patent No. 88,094, dated March 23, 1869.

IMPROVED RULE-CLAMP.

The Schedule referred to in these Letters Patent and making part of the same.

*To all whom it may concern:*

Be it known that I, D. H. STEPHENS, of Riverton, in the county of Litchfield, and State of Connecticut, have invented a new and improved Rule-Clamp; and I do hereby declare that the following is a full, clear, and exact description of the same, reference being had to the annexed drawings, making a part of this specification, in which—

Figure 1 is a side view.

Figure 2, an edge view.

Figure 3, also a side view, showing the rule-pieces and joint in their proper positions, and the manner in which the end and side-pressure is produced upon the joint of the rule.

Figure 4 shows the forked piece, with the bevelled jaws attached.

The object of this invention is to provide an improved device for pressing the metallic joints of mechanics' rules tightly against the wooden portion, so that in drilling the rivet or pin-holes, and inserting the pins which hold the parts together, a perfect seating of the joint is obtained, to render it firm and secure within the rule.

The operation of the clamp is as follows:

The rule A is placed in the forked piece B, with one end against a stop, C, and the other (with the joint) between the bevelled jaws $a$. Then, by turning the thumb-screw $b$, the small movable nut, or fitted iron piece $c$, is forced against the end of the joint, which forces the bevelled jaws $a\ a$ into the corresponding places in the clamp-frame D, producing an end and side-pressure, with one operation of the screw, in the most simple and effective manner.

This may also be done by removing the tongue-portion, or forked piece B, from the bevelled ends, or jaws, and connecting them direct with the movable nut and screw $c$.

Claim.

As a new article of manufacture, the rule-clamp herein described, consisting of the forked piece B, having the stop C and bevelled jaws $a$, the clamp-frame D, screw $b$, and nut $c$, all constructed, arranged, and operating, as herein described, for the purpose specified.

The above specification of my invention, signed by me, this 19th day of January, 1866.

D. H. STEPHENS.

Witnesses:
   CHAS. B. STEPHENS,
   JAMES R. SMITH.